United States Patent
Mukaiya

[11] Patent Number: 5,337,115
[45] Date of Patent: Aug. 9, 1994

[54] FOCUS DETECTING DEVICE

[75] Inventor: Hitoshi Mukaiya, Saitama, Japan

[73] Assignee: Canon Kabushiki Kaisha, Tokyo, Japan

[21] Appl. No.: 126,807

[22] Filed: Sep. 24, 1993

Related U.S. Application Data

[63] Continuation of Ser. No. 873,701, Apr. 22, 1992, abandoned, which is a continuation of Ser. No. 403,608, Sep. 6, 1989, abandoned.

Foreign Application Priority Data

Sep. 12, 1988 [JP] Japan .................. 63-226505

[51] Int. Cl.$^5$ ............................. G03B 13/00
[52] U.S. Cl. .................. 354/402; 250/201.9
[58] Field of Search .................. 354/402–409, 354/429, 430, 432; 250/201.1, 201.2, 201.7, 201.8, 201.9, 237 R, 237 G

[56] References Cited

U.S. PATENT DOCUMENTS

| | | | |
|---|---|---|---|
| 4,572,476 | 2/1986 | Oinoue | 250/201 PF |
| 4,593,188 | 6/1986 | Ida | 354/407 |
| 4,708,436 | 11/1987 | Kleinknecht | 250/578 |

Primary Examiner—David M. Gray
Attorney, Agent, or Firm—Robin, Blecker, Daley & Driscoll

[57] ABSTRACT

A focus detecting device is disclosed including an image sensor, a phase control plate for causing image forming positions of light incident on a plurality of areas in an imaging plane of the image sensor to differ from each other, and a focus detecting circuit for computing the image signals corresponding to the plurality of areas of which the image forming positions are different to detect a focusing state. A solid-state image sensor is also disclosed including a plurality of photoelectric conversion element rows and a phase control plate positioned on a photoelectric conversion plane of the photoelectric conversion element rows to cause image forming positions of incident light to differ at intervals of integer times the interval in the photoelectric conversion element rows.

23 Claims, 6 Drawing Sheets

FOCUS DETECTING DEVICE

This is a continuation application under 37CFR 1.62 of prior application Ser. No. 873,701, filed Apr. 22, 1992, which is a continuation of Ser. No. 403,608, filed Sep. 6, 1989 (both abandoned).

BACKGROUND OF THE INVENTION

1. Field of the Invention

This invention relates to auto-focus devices for video cameras and, more particularly, to a solid-state image sensing apparatus in which auto-focusing (hereinafter AF) is performed without using a drive portion for carrying out modulation of the optical path or the like to obtain focus information.

2. Description of the Related Art

The prior known auto-focus devices utilizing TV video signals are described in great detail in "Showa 40th year's NHK technology research Volume 17, No. 1, serial No. 86, pages 21–37" and others. Also, as described in Japanese Laid-Open Patent Application No. Sho 52-104245 and Japanese Laid-Open Patent Application No. Sho 56-51164, there is a so-called "hill climb servo type" in which the focusing lens is moved so that the focus voltage proportional to the magnitude of the high frequency component of the video signal gets ever higher. In another type as described in Japanese Laid-Open Patent Application No. Sho 58-188965, the image sensor or the focusing lens itself is moved to a small excursion to modulate the optical path, and from the phase of change of the focus voltage, the direction in which the focusing lens is to move is determined, so that the focusing lens is moved in the above-described way or in the direction to increase the focus voltage. Since, in the device of this so-called "optical path modulation type", information representing the near-focus state, or the far-focus state of the lens can be obtained, the direction in which the lens is to move can previously be sensed, so that the focusing can be carried out accurately and swiftly.

In the hill climb servo type described in Japanese Laid-Open Patent Application No. Sho 52-104245, however, the focusing lens must preliminarily be moved. Otherwise, the lens drive direction cannot be known. Thus, once the focusing lens is moved, if the blurring intensifies, the direction is reversed, or if the image gets sharper, the movement of the focusing lens in that direction is continued. Where the blurring no longer diminishes by moving it in either of the two directions is taken as the in-focus point. Therefore, there are many wasteful motions. Another drawback is that the focusing speed becomes slow. In the type described in Japanese Laid-Open Patent Application No. Sho 58-188965, on the other hand, because besides the movement for focus adjustment of the focusing lens, minute excursions of the image sensor, the focusing lens, etc. must be performed. For this reason, the construction of the device itself becomes complicated and large-sized. Nevertheless, the requirement for precision accuracy is rigorous. These points constitute problems of the latter type.

SUMMARY OF THE INVENTION

A first object of the present invention is to eliminate the above-described problems and to provide an image sensing apparatus for an AF system capable of performing the focusing of a lens with high efficiency.

A second object of the invention is to provide an image sensor suited to be used in the AF device with an advantage of simplifying the construction of the AF device, in which information representing the direction of blur, the amount of blur, etc. can be obtained without performing modulation of the optical path.

To achieve such objects, according to the invention, in a preferred embodiment thereof, a solid-state image sensor is disclosed, comprising a plurality of photoelectric conversion element rows, and a phase control plate formed on photoelectric conversion planes of the photoelectric conversion element rows at intervals of integer times the interval in the photoelectric conversion element rows to cause image forming positions of incident light beams to differ from each other.

A third object of the invention is to provide an AF device in which without using a drive mechanism for driving the image sensor or the like to form a signal for focus adjustment, the focusing can be carried out quickly and accurately.

To achieve such an object, in a preferred embodiment according to the invention, a focus detecting device is disclosed, comprising image sensing means, means for causing image forming positions of incident light beams to differ with a plurality of areas in an imaging plane of the image sensing means, and focus detecting means for computing image signals corresponding to the plurality of areas having different image forming positions to detect a focusing state.

Another or fourth object of the invention is to provide an automatic focus detecting device capable, despite having no drive parts except one for moving the focusing lens to the in-focus position, of rapidly detecting the direction and amount of movement of the focusing lens.

Another or fifth object of the invention is to provide a video camera having focus detecting means capable, despite no use of means for modulating the optical path or like means, of detecting the direction of blur and the amount of blur from the output of image sensing means.

Other objects and features of the invention will become apparent from the following written specification and drawings.

DETAILED DESCRIPTION OF THE PREFERRED EMBODIMENTS

In the following, by reference to the drawings, the image sensing apparatus in the invention is described in great detail in connection with an embodiment thereof.

Figure 1:
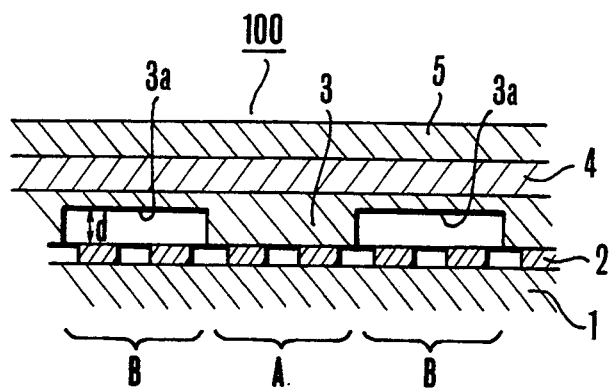
FIG. 1 and FIG. 2 are sectional views of embodiments of a solid-state image sensor according to the invention.
Figure 2:
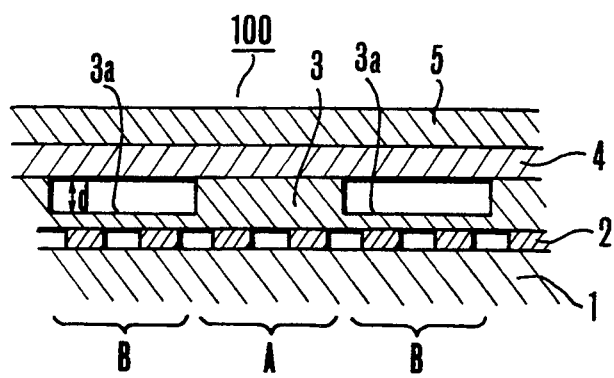

FIG. 1 and FIG. 2 are drawings respectively depicting embodiments of a solid-state image sensor of the invention, and showing the section of the solid-state image sensors 100 in the present patent application. The solid-state image sensors 100 shown in FIG. 1 and FIG. 2 each comprise photoelectric conversion element rows 2 arrayed on a substrate 1, a phase control plate 3 arranged just in front of the photoelectric conversion element rows 2 to cause image forming positions of incident light beams to differ from each other, a color separation filter 4 and a face plate 5. The solid-state image sensor 100 shown in FIG. 1 and the solid-state image sensor 100 shown in FIG. 2 are different from each other only in the position of grooves 3a of the phase control plate 3, and they have a similar effect. Therefore, the same constituent parts and the corresponding parts are denoted by the same reference numerals. The grooves 3a of the phase control plate 3 shown in FIG. 1 and FIG. 2 are arranged at intervals of two photoelectric conversion element rows.

A light beam incident on that part of the photoelectric conversion element rows which are adjacent to the part A where the groove 3a of the phase control plate 3 is not present and a light beam incident on that part of the photoelectric conversion element rows which are adjacent to the part B where the groove 3a of the phase control plate 3 have their optical paths different in length from each other by an amount $d(1-(1/n))$ where d is the depth of the groove 3a of the phase control plate 3 and n is the refractive index of the medium of the phase control plate 3.

Next, the principle of an operation of the above solid-state image sensor is further explained by using FIGS. 3(A) to 3(C) and FIGS. 4(A) to 4(C).

An image formed on the imaging plane of the image sensor by a photographic lens takes its place with the light beam reaching the photoelectric conversion element rows in the area A at a farther distance than with the light beam reaching the photoelectric conversion element rows in the area B by $d(n-(1/n))$. Further, the positions at which the light beam reaching the photoelectric conversion element rows in the area A and the light beam reaching the photoelectric conversion element rows in the area B form the respective images vary as the lens moves.

Meanwhile, upon consideration of the relationship between the video signal produced from the image sensor and the focusing state of the object image on the imaging plane, it is known that as the lens approaches the in-focus position, the level of the high frequency component in the video signal rises.

Hence, the light beams directed to the areas A and B of the photoelectric conversion element rows of the image sensor differ in the length of the optical path and in the image forming position. Therefore, the degrees of in-focus (or the amounts of defocus) corresponding to the area A and the area B are caused to differ from each other. In other words, the voltage level $V_A$ of the high frequency component of the video signal corresponding to the area A and the voltage level $V_B$ of the high frequency component of the video signal corresponding to the area B are caused to differ from each other, depending on the difference between the lengths of their optical paths. These relations are shown in FIGS. 4(A) to 4(C). The example of FIGS. 3(A) to 3(C) is shown, for the purpose of simplifying the explanation, as including one photoelectric conversion element row in each of the areas A and B.

Figure 3A:
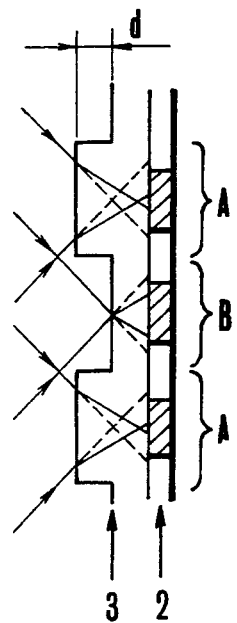
FIGS. 3(A), 3(B) and 3(C) are diagrams for explaining the principle of detection of the amount of defocus in the embodiment of the invention.
Figure 3B:
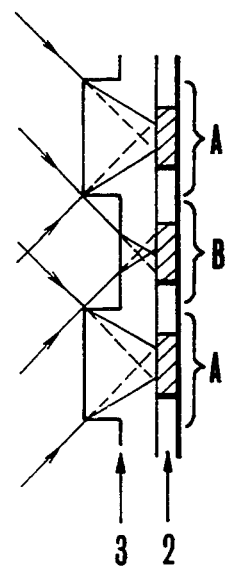
Figure 3C:
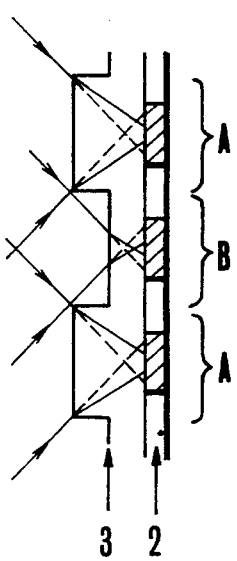
Figure 4A:
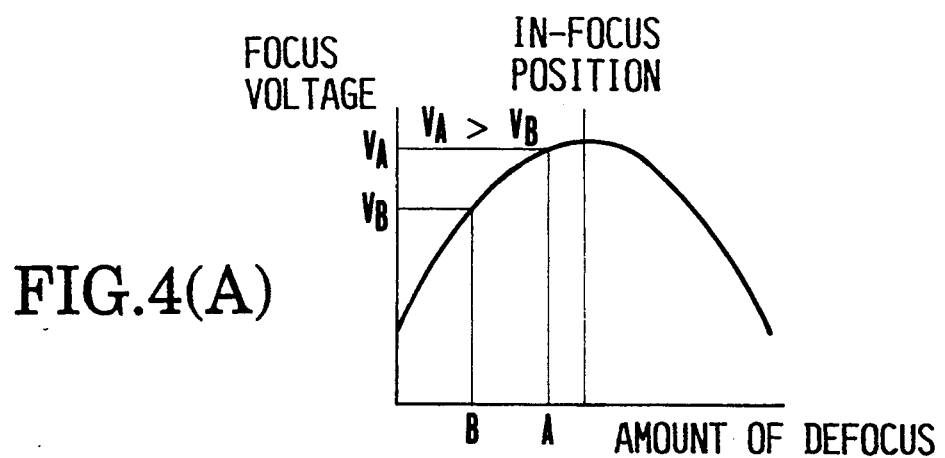
FIGS. 4(A), 4(B) and 4(C) are graphs showing characteristic curves of the focus voltage relative to the amount of defocus in the embodiment of the invention.
Figure 4B:
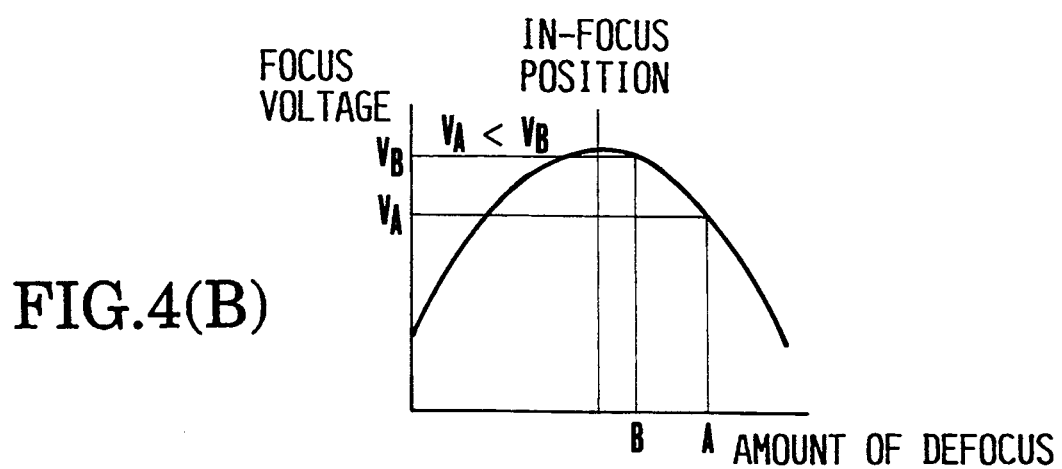
Figure 4C:
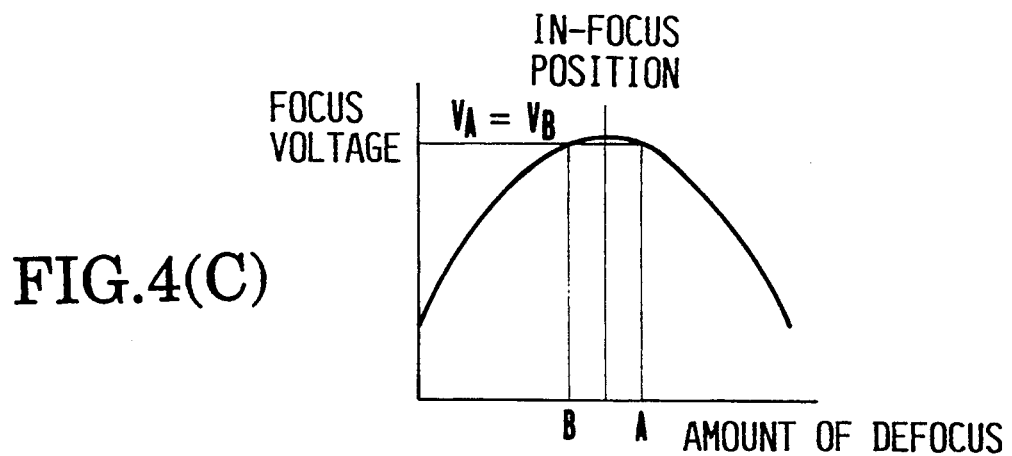

FIGS. 3(A) to 3(C) and FIGS. 4(A) to 4(C) correspond to each other respectively. In the case of FIG. 3(A), the incident light beams form images axially ahead of the imaging plane, that is, in front of the imaging plane with respect to both the areas A and B, so that the in-focus position is not reached. In this case, of the area A and the area B, because the sharp image for the area A takes its place nearer to the imaging plane which is at the rear, the level of the voltage representing the amount of the high frequency component is higher. That is, $V_A > V_B$. FIG. 4(A) shows such a state.

In the case of FIG. 3(B), the incident light beams form images axially behind the imaging plane, that is, in rear of the imaging plane with respect to both the areas A and B, so that the in-focus position is not reached. In this case, of the area A and the area B, because the sharp image for the area B is nearer to the imaging plane which is at the front, the level of the voltage representing the amount of the high frequency component becomes higher. That is, $V_A < V_B$. FIG. 4(B) shows such a state.

The position of the photographic lens or the image sensor is then adjusted so that such a state as shown in FIG. 3(C), or such a state as shown in FIG. 4(C) is reached where $V_A = V_B$ is obtained. Since the amounts of defocus for the area A and the area B from the in-focus position are equal to each other, it may be determined to be in focus.

In this case, the lengths of the optical paths for the area A and the area B differ by $d(1-(1/n))$ which defines an error range. Hence, its value represents the accuracy of focusing control. However, on consideration of the number of picture elements of the image sensor, it is possible in actual practice to obtain an accuracy high enough for the operator not to discriminate the blurring due to this error on the picture.

Figure 5:
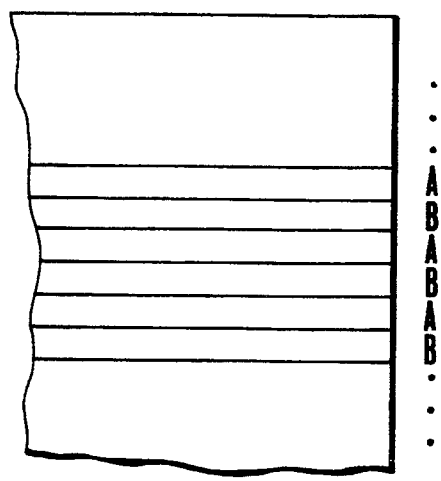
FIG. 5 is a fragmentary front elevation view in enlarged scale of the solid-state image sensor of the embodiment of the invention.

FIG. 5 is a view looked from the front of part of the solid-state image sensor of the invention. The photoelectric conversion element row of the area A and the photoelectric conversion element row of the area B are set in such a form as to include one or several scanning lines. Its range covers the entirety of the image sensor. In the image sensor of this type, because the object to be photographed is laterally scanned, for that portion of the object which has, for example, vertical stripes, the largeness or smallness of the high frequency component of the video signal determines the focus voltage. Therefore, an AF of strong sensitivity to the vertical stripes results.

Figure 7:
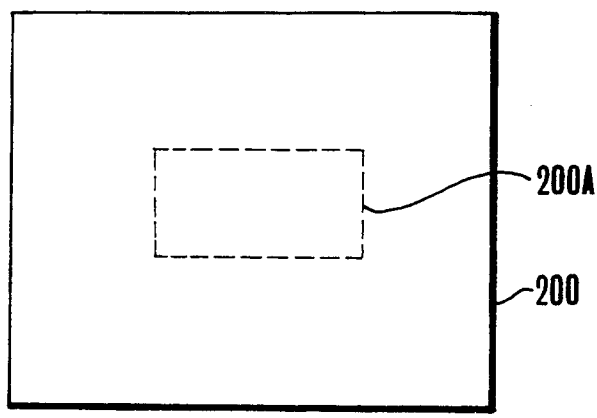
FIG. 7 is a plan view of another example of the AF detecting area on the imaging plane.

However, the range to be utilized in AF is not necessarily limited to the entirety of the imaging plane of the image sensor. As shown in FIG. 7, an arbitrary portion of the picture 200 may be utilized as an AF area 200A. In the present embodiment, explanation has been made about the case where the sensor is laterally (horizontally) scanned. Yet, the A and B rows of the phase control plate 3 may be arrayed in the longitudinal direction of the photoelectric conversion element rows, so that vertical scanning is performed. In this case, determination of the in-focus point is made by the high frequency component of the lateral stripes.

Also, the video information having the optical path length difference $d(1-(1/n))$ should be sent to the AF circuit before it is subjected to enhancement of the contour of the image by obtaining the correlation between the scanning lines, or other image treatments. A deterioration owing to the blurring of the image itself due to the slight optical path length difference, because of being recovered in passing through an image processing circuit, will not be induced to occur.

It is to be noted that though the phase control plate 3 is usually manufactured by the technique of etching polymethyl metacrylate (PMMA), it may otherwise be manufactured by using dielectric or like material in combination with the evaporating technique. Even this does not deviate from the objects of the invention.

Figure 6:
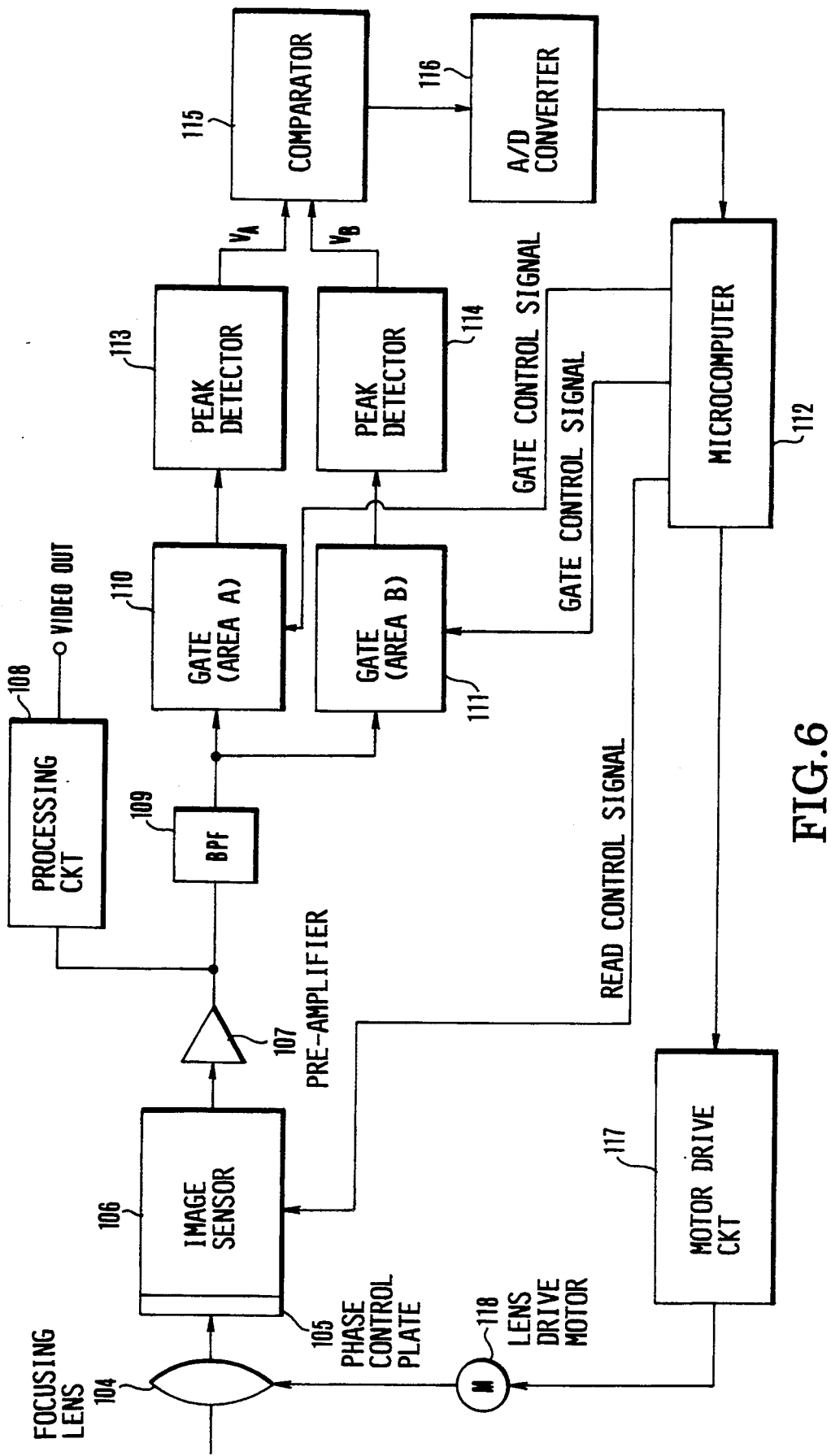
FIG. 6 is a diagram illustrating the construction and arrangement of the parts of the device of the embodiment of the invention.

FIG. 6 shows the construction of an AF apparatus using the solid-state image sensor of the embodiment of the invention. With reference to this figure, a practical method of obtaining the focus signals $V_A$ and $V_B$ corresponding to the A area and B area of the phase control plate so that the AF operation is performed is described.

An image formed on the imaging plane of the image sensor 106 through the focusing lens 104 and the phase control plate 105 is photoelectrically converted and amplified by a pre-amplifier 107. The amplified image signal is subjected to a predetermined processing by a processing circuit 108 and outputted as a formatted video signal.

Meanwhile, the output of the pre-amplifier 107 passes through a BPF (band-pass filter) 109 where a predetermined high-frequency component which is effective to the AF on the photographic picture, is extracted. This high-frequency component is supplied to each of gates 110 and 111. The gate 110 is a gate circuit for sampling the video signal corresponding to the area A equivalent to the ridges of the phase control plate 3. The gate 111 is a gate circuit for sampling the video signal corresponding to the area B equivalent to the recesses of the phase control plate 3. The gate circuits 110 and 111 are controlled by a microcomputer 112 which produces various control signals beginning with a read timing signal for the CCD. Depending on the phase of the reading operation of the CCD, the video signals for the areas A and B are taken out.

The signals taken out by the gates 110 and 111 are supplied to respective peak detectors 113 and 114 where the peak values $A_A$ and $V_B$ of the output of the gates 110 and 111 in a predetermined period (for example, field period) are detected. These values are then compared with each other by a comparator 115. Depending on the comparison result by the comparator 115, discrimination between the focusing states such as those shown in FIGS. 4(A) to 4(C) becomes possible.

The comparison output of the comparator 115 is A/D converted by an A/D converter 116 and supplied to the microcomputer 112. The microcomputer 116 examines on the basis of its data whether the image is in focus or out of focus, and when out of focus, whether it is in the near-focus or the far-focus state, and determines how much the amount of defocus is. Then, a motor drive circuit 117 is controlled in accordance with this determination result, thus energizing a lens drive motor 118. Hence, the focusing lens 104 can be moved to the in-focus point, that is, the position where $V_A = V_B$ is obtained.

As has been described above, according to the invention, a solid-state image sensor formed with inclusion of a plurality of photoelectric conversion element rows and a phase control plate formed on photoelectric conversion element rows at intervals of integer times the interval in the photoelectric conversion element rows to cause image forming positions of incident light beams to differ from each other has been realized. In application to video cameras, etc. therefore, without necessity of a complicated mechanism such as optical path modulating means for wobbling the image sensor or the lens in order to detect the near-focus, far-focus information, etc. and without having to have no drive portions except for moving the focusing lens, an AF apparatus capable of rapidly detecting the direction and amount of movement of the focusing lens can be provided.

What is claimed is:

1. A focus detecting device comprising:
   (A) image sensing means for photoelectrically converting incident light to produce a video signal and predetermined signal components in image signals which change their levels in accordance with a focusing state;
   (B) an optical path control member formed with a plurality of concave portions and convex portions thereon for causing image forming positions of a light incident on an image sensing plane of said image sensing means in a direction of the incident light to vary in relation to said plurality of concave or convex portions; and
   (C) computing means for comparing image signals corresponding to said plurality of concave portions with image signals corresponding to said plurality of convex portions and detecting a focusing state on said image sensing plane on the basis of a result of the comparison.

2. A device according to claim 1, wherein said image sensing means is constructed from a plurality of photoelectric conversion element rows arrayed at a predetermined interval.

3. A device according to claim 2, wherein said optical path control member causes said image forming positions of the incident light to differ at intervals of integer times the interval in said photoelectric conversion element rows.

4. A device according to claim 3, wherein said optical path control member has grooves (or ridges) formed at intervals of integer times the interval in said photoelectric conversion element rows to cause image forming positions of light incident on said photoelectric conversion element rows to differ from each other.

5. A device according to claim 4, wherein a difference in the length of an optical path between an area where said grooves (or ridges) are formed and an area where said grooves (or ridges) are not formed exists by $d(1-(1/n))$ where d is the depth (or height) of said grooves (or ridges) of said optical path control member, and n is a refractive index of said optical path control member.

6. A device according to claim 1 or 5, wherein said computing means determines the focusing state on the basis of the level of a component according to the degree of in-focus in said image signal.

7. A device according to claim 6, wherein said computing means compares the levels of components according to the degree of in-focus obtained from the respective image signals corresponding to said plurality of areas, and judges whether the image signal is in an in-focus state or an out-of-focus state and whether the image signal is in a near-focus state or a far-focus state.

8. A device according to claim 7, further comprising:
   focus adjusting means for adjusting an image forming state of light incident on said imaging plane on the basis of an output of said computing means,
   said focus adjusting means performing focus adjustment by axially driving a photographic lens for focusing an image with light incident on said imaging plane.

9. A device according to claim 6, wherein said component according to the degree of in-focus is a high frequency component in the image signal.

10. A focus detecting device comprising:
(A) image sensing means for photoelectrically converting incident light to produce an image signal;
(B) a control plate formed with a plurality of concave portions and convex portions thereon for causing the lengths of optical paths to differ with a plurality of areas opposite to said concave portions and convex portions on an image sensing plane of said image sensing means;
(C) signal processing means for processing said image signal produced by said image sensing means to output a video signal;
(D) gate means for extracting image signals corresponding to said plurality of areas in separation; and
(E) computing means for computing peak values of predetermined components in the image signals which change their levels in accordance with a focusing state corresponding to said plurality of areas extracted by said gate means to detect a focusing state by comparing the peak value relative to said area opposite to said concave portions with the peak value relative to said area opposite said convex portions.

11. A device according to claim 10, wherein said image sensing means is constructed from a plurality of photoelectric conversion element rows arrayed at a predetermined interval.

12. A device according to claim 11, wherein said control plate causes image forming positions of the incident light to differ at intervals of integer times the interval in said photoelectric conversion element rows.

13. A device according to claim 12, wherein said control plate has grooves (or ridges) formed at intervals of integer times the interval in said photoelectric conversion element rows to cause image forming positions of light incident on said photoelectric conversion element rows to differ from each other.

14. A device according to claim 10, wherein a difference in the length of an optical path between an area where said grooves (or ridges) are formed and an area where said grooves (or ridges) are not formed exists by $d(1-(1/n))$ where d is the depth (or height) of said grooves (or ridges) of said control plate, and n is a refractive index of said control plate.

15. A device according to claim 10 or 14, wherein said computing means determines the focusing state on the basis of the level of a component according to the degree of in-focus in said image signal.

16. A device according to claim 15, wherein said computing means compares the levels of components according to the degree of in-focus obtained from the respective image signals corresponding to said plurality of areas, and judges whether the image signal is in an in-focus state or an out-of-focus state and whether the image signal is in a near-focus state or a far-focus state.

17. A device according to claim 16, further comprising:

focus adjusting means for adjusting an image forming state of light incident on said imaging plane on the basis of an output of said computing means,
said focus adjusting means performing focus adjustment by axially driving a photographic lens for focusing an image with light incident on said imaging plane.

18. A device according to claim 10, wherein said control plate is adhered to an imaging plane of said image sensing means.

19. An image sensing apparatus using a solid-state image sensor comprising:
(A) image sensing means having an image sensing plane formed by arraying a plurality of photoelectric conversion element rows at a first pitch, said image sensing means photoelectrically converting an object image formed on said image sensing plane to an image signal;
(B) image processing means for processing said image signal to output a video signal;
(C) a control plate positioned on said image sensing plane and formed with a plurality of concave portions and convex portions at a second pitch thereon for causing the lengths of optical paths of light incident to differ with a plurality of areas opposite said concave portions and convex portions on said image sensing plane; and
(D) focus detecting means for detecting focus degree relative to the image sensing plane by using the image signal which has been photoelectrically converted by said photoelectric conversion elements and outputted from said image sensor, said focus detecting means being arranged to detect peak levels of high frequency components in said image signal in groups of a plurality of photoelectric conversion elements respectively having said different optical path lengths incident thereon and computing said focus degree by comparing said image signals corresponding to said different optical path lengths incident each other.

20. An image sensing apparatus according to claim 19, wherein said control plate has a plurality of grooves or ridges formed at said second interval.

21. An image sensing apparatus according to claim 20, wherein said second interval is equal to integer times said first interval.

22. A sensor according to claim 19, wherein said solid-state image sensor is a CCD.

23. An image sensing device, comprising:
(A) image sensing means for photoelectrically converting an incident light on an image sensing plane to produce an image signal;
(B) an optical control plate arranged on said image sensing plane and formed with a plurality of concave portions and convex portions thereon for varying optical paths between said concave portions and convex portions;
(C) output means for independently outputting image signals corresponding to the area opposite to said concave portions and convex portions; and
(D) computing means for comparing said image signals corresponding to the area opposite said concave portions with said image signals corresponding to the area opposite said convex portions to detect a focusing state on said image sensing plane.

* * * * *

UNITED STATES PATENT AND TRADEMARK OFFICE
CERTIFICATE OF CORRECTION

PATENT NO. : 5,337,115
DATED : August 9, 1994
INVENTOR(S) : Hitoshi Mukaiya

It is certified that error appears in the above-identified patent and that said Letters Patent is hereby corrected as shown below:

Col. 4, line 10.   After "higher" delete ".", and insert --,--

Col. 4, line 11.   Change "That" to -- that --.

Col. 4, line 20.   After "higher" delete ".", and insert --,--.

Col. 4, line 21.   Change "That" to -- that --.

Col. 4, line 37.   Change "looked" to -- as seen --.

Col. 5, line 40.   Change "$A_A$" to -- $V_A$ --.

Col. 5, line 49.   Change "116" to -- 112 --.

Col. 6, line 3.    Delete "no".

Signed and Sealed this

Sixth Day of December, 1994

Attest:

BRUCE LEHMAN

Attesting Officer

Commissioner of Patents and Trademarks